April 11, 1933.   J. F. BROCK   1,903,653
AUTOMOBILE HEATER
Filed Feb. 11, 1931
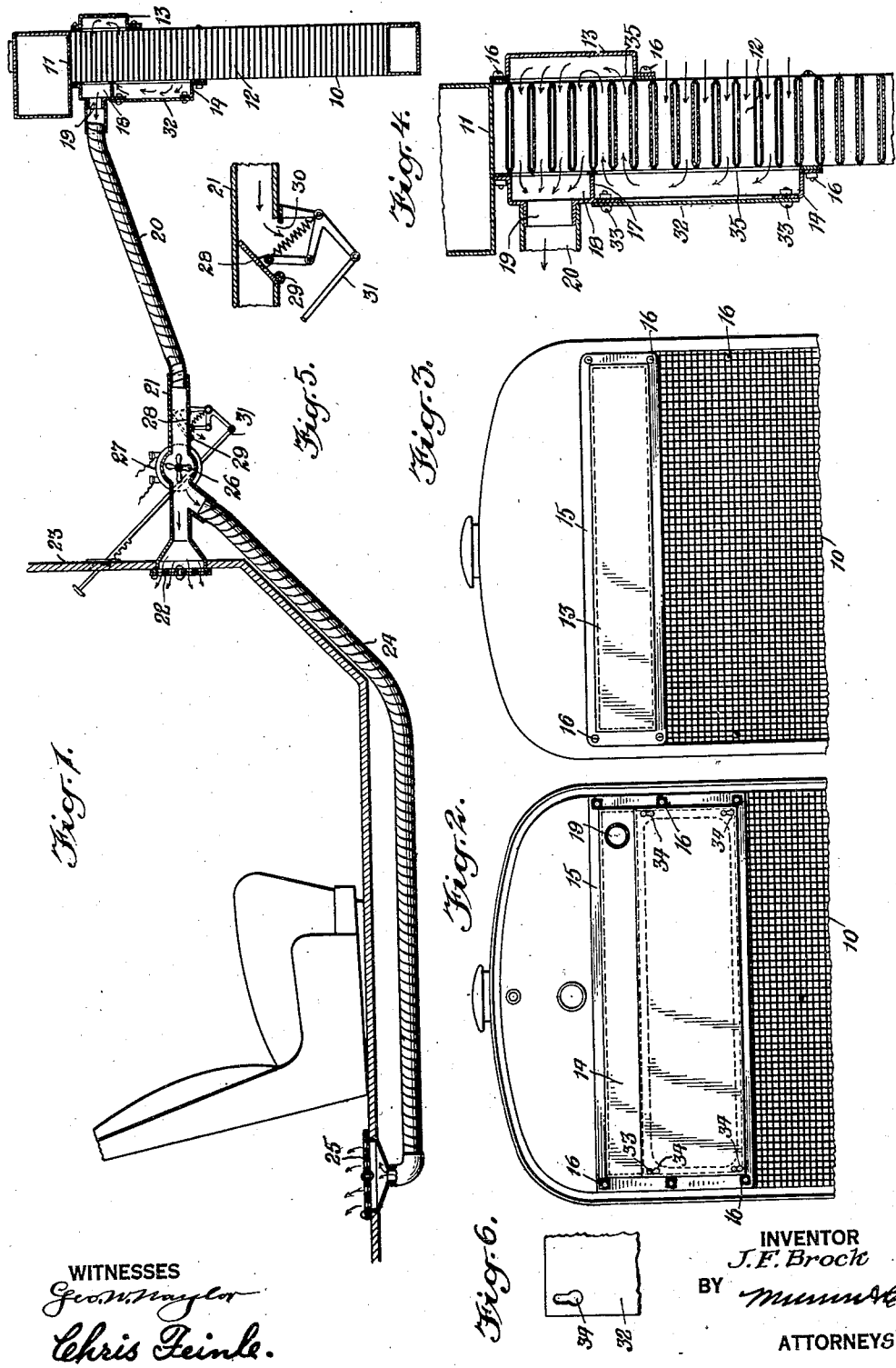
WITNESSES
INVENTOR
J. F. Brock
BY
ATTORNEYS Patented Apr. 11, 1933

1,903,653

UNITED STATES PATENT OFFICE

JACK F. BROCK, OF SCIO, OREGON

AUTOMOBILE HEATER

Application filed February 11, 1931. Serial No. 515,113.

This invention relates to a heater for automobiles which utilizes the heat of the water of the engine cooling system thereof, for the purpose of heating the driver's and passenger compartments of the automobile.

The invention has for its general object the provision of improvements in a heater of the indicated character, whereby the heat may be controlled and regulated to compensate for weather temperature changes; whereby a large volume of hot air may be obtained from the radiator of the automobile; and whereby the heater will be of simple and substantial design well suited for economic manufacture.

The nature of the invention and its distinguishing features and advantages will appear when the following specification is read in connection with the accompanying drawing, in which Figure 1 is a side view, partly in section, showing a heater embodying the features of the invention in conjunction with certain appurtenances of an automobile;

Figure 2 is a rear elevation of the upper part of the automobile radiator and showing the rear air circulating baffle applied thereto;

Figure 3 is a front elevation of the upper part of the radiator and showing the front air circulating baffle applied thereto;

Figure 4 is a vertical section of the upper part of the radiator and the front and rear air circulating baffles as applied thereto;

Figure 5 is a section showing the hot air cutout valve;

Figure 6 is a view of one of the details.

Referring now more particularly to the drawing, it will be apparent that the embodiment of the invention illustrated includes a radiator 10 forming a part of the engine cooling system of an automobile. The radiator 10 includes the usual hot water compartment having a lower wall 11. The radiator 10 also includes air passages 12 which extend through the same from the front to the rear thereof. Baffles, in the form of boxes consisting of a front box 13 and a rear box 14, are secured to the radiator 10 to close the front and rear sections thereof to cause air to circulate upwardly from the rear ends of certain of the air passages 12, then forwardly through certain of the air passages 12, and then upwardly and rearwardly through certain of the air passages 12. The boxes 13 and 14 will be designed to harmonize with the size and design of the radiator. In order to cause the air to circulate in the manner set forth, the front box 13 will be smaller than the rear box 14, being approximately one-half the size of the box 14. Each of the boxes has a marginal flange 15. Bolts 16 extend through the radiator and the flanges 15 to securely hold the boxes in place. It will be apparent that the box 14 extends or falls below the lower wall of the front box 13. This will cause air passing into certain of the air passages 12 to enter the rear box 14. The rear box 14 has a horizontal partition 17 which causes the air entering the lower part of the box 14 to circulate forwardly through certain of the passages 12 into the box 13. The provision of the partition 17 provides a hot air chamber 18 at the top of the box 14. The air entering the front box 13 is caused to circulate rearwardly through certain of the air passages 12 into the chamber 18. The chamber 18 has a hot air outlet 19.

The hot air is fed from the outlet 19 by a conduit or pipe having one end connected with the outlet 19 in any suitable manner and its opposite end being connected with a fitting 21 having a register 22 with variable openings at one end on the dash 23 to discharge hot air into the front compartment of the automobile. A conduit or pipe 24 has one end thereof connected in any suitable manner with the fitting 21 in communication with the interior thereof, and its opposite end is connected in any suitable manner with a register 25 having variable openings to discharge hot air into the rear compartment of the automobile. The registers 22 and 25 may be of any preferred conventional type. It will now be understood that hot air will be forced rearwardly by the pressure of the air entering the radiator 10 in the forward movement of the automobile. This hot air will be forced through the pipe 20, fitting 21 and pipe 24 into the front and rear compartments of the automobile.

In order to obtain a forced circulation of air while the automobile is at a standstill, and while the water in the radiator is still heated, there is provided a small fan 26 in an enlarged section of the fitting 21. The fan 26 may be operated in any preferred manner, and in the present instance is operated by an electric motor 27.

In order to control the circulation of hot air from the outlet 19 there is provided a cut-out valve member 28 which is pivoted as at 29 and which controls an opening 30 in the fitting 21. The member 28 may be moved to an opened and closed position by any suitable means 31 under the control of the driver of the automobile. The valve member 28 opens inwardly, as shown in Figure 5, and will cause the hot air entering the fitting 21 from the pipe 20 to discharge through the opening 30 into the hood of the automobile. The provision of the cut-out valve member 28 makes it possible to shut off the hot air to the registers 22 and 25. It will also be understood that each of the registers 22 and 25 may be closed while the valve member 28 is in its closed position in the opening 30.

In accordance with another feature of the invention, the rear box 14 has a removable rear wall 32 which is detachably held in place by suitable fastening elements 33 which are received respectively in keyhole slots 34 in the four corners of the wall 32. By loosening the fastening elements 33, the wall 32 may be lifted up slightly and then be separated from the elements 33. The air may then pass through the box 14 instead of circulating upwardly. This will increase the cooling efficiency of the radiator 10 during the summer months when it is not necessary to heat the interior of the automobile driver and passenger compartments.

It is to be understood that the boxes 13 and 14 may be of any preferred proportions with respect to each other, and also with respect to the radiator to which they are applied. These boxes may be of any size and design in order to harmonize with the size and design of the radiator. If desired, a suitable gasket 35 may be arranged between each box and the radiator as shown in order to make an air-tight fit.

What is claimed is:

1. In a heater of the class described, the combination of a radiator having air passages extending therethrough, and boxes closing front and rear sections of said radiator to cause air to circulate upwardly and forwardly and then upwardly and rearwardly, and said rear box having a removable rear wall to allow air to flow through the radiator in the usual way when said wall is removed.

2. In a heater of the class described, the combination of a radiator having air passages extending therethrough, and box baffles applied to front and rear sections of said radiator, the baffle at the rear being larger than the baffle at the front and extending below the lower end of the latter, whereby air is caused to travel in a tortuous path through said radiator, the rear baffle having a part which may be removed to allow air to pass directly through the air passages in the usual manner.

3. In a heater of the class described, in combination, a radiator having air passages extending therethrough, an air baffle secured in relation to a rear section of the radiator to gather air to be heated by the radiator, and means secured to a baffle which cooperates with said baffle to convey the heated air away from the radiator, and said baffle having a removable part to allow the flow of air through the radiator in the usual way when said part is removed.

JACK F. BROCK.